United States Patent
Murayama

(10) Patent No.: US 8,873,123 B2
(45) Date of Patent: Oct. 28, 2014

(54) MICROSCOPE APPARATUS HAVING A MODULATION-REGION ADJUSTING UNIT THAT MOVES A WAVEFRONT MODULATION REGION IN RESPONSE TO PIVOTING OF MIRRORS

(75) Inventor: Yoshiaki Murayama, Machida (JP)

(73) Assignee: Olympus Corporation, Tokyo (JP)

( * ) Notice: Subject to any disclaimer, the term of this patent is extended or adjusted under 35 U.S.C. 154(b) by 659 days.

(21) Appl. No.: 12/930,963

(22) Filed: Jan. 19, 2011

(65) Prior Publication Data
US 2011/0255157 A1 Oct. 20, 2011

(30) Foreign Application Priority Data

Jan. 21, 2010 (JP) .................................. 2010-011046
Jan. 18, 2011 (JP) .................................. 2011-008248

(51) Int. Cl.
*G02B 26/10* (2006.01)
*G02B 21/00* (2006.01)

(52) U.S. Cl.
CPC ........ *G02B 21/0032* (2013.01); *G02B 21/0072* (2013.01); *G02B 21/0036* (2013.01)
USPC ....................................... 359/202.1; 359/385

(58) Field of Classification Search
None
See application file for complete search history.

(56) References Cited

U.S. PATENT DOCUMENTS

| | | | |
|---|---|---|---|
| 5,760,951 A | 6/1998 | Dixon et al. | |
| 6,771,417 B1 | 8/2004 | Wolleschensky et al. | |
| 7,180,661 B2 | 2/2007 | Sasaki | |
| 7,326,899 B2 * | 2/2008 | Ri | 250/201.3 |
| 7,633,053 B2 | 12/2009 | Wolleschensky et al. | |
| 2006/0007534 A1 | 1/2006 | Fukuyama et al. | |
| 2006/0152799 A1 | 7/2006 | Ri | |
| 2007/0153373 A1 | 7/2007 | Uhl | |
| 2007/0253057 A1* | 11/2007 | Potsaid et al. | 359/384 |
| 2008/0204766 A1 | 8/2008 | Uhl | |
| 2008/0291532 A1 | 11/2008 | Xu et al. | |
| 2009/0161208 A1 | 6/2009 | Kempe et al. | |
| 2009/0174935 A1 | 7/2009 | Szulczewski et al. | |

FOREIGN PATENT DOCUMENTS

| | | |
|---|---|---|
| EP | 1 372 011 | 12/2003 |
| GB | 2 441 162 | 2/2008 |
| JP | H04-165325 A | 6/1992 |
| JP | 2003-098437 A | 4/2003 |

(Continued)

OTHER PUBLICATIONS

Extended European Search Report, dated May 10, 2011, issued in corresponding European Patent Application No. 11000356.3.

*Primary Examiner* — Derek S Chapel
(74) *Attorney, Agent, or Firm* — Kenyon & Kenyon LLP

(57) ABSTRACT

Illuminating light is two-dimensionally scanned without changing the ability to focus illuminating light on a specimen. A microscope has a spatial light modulator for the wavefront of illuminating light from a light source; a scanner having two mirrors independently pivoted about two non-parallel axes; a relay optical system guiding the illuminating light, whose traveling direction has been changed by the scanner, to an objective optical system; and an adjusting unit that moves a wavefront modulation region of the modulator, in which an image is formed, in response to pivoting of the mirrors, such that an image at the pupil position of the objective optical system assuming that the mirrors are stopped is moved opposite to the direction of movement of the image relayed to the pupil position of the objective optical system assuming that the mirrors are pivoting while the image on the spatial light modulator is fixed.

9 Claims, 4 Drawing Sheets

(56) References Cited

FOREIGN PATENT DOCUMENTS

| JP | 2006-106336 A | 4/2003 |
| JP | 2005-165212 | 6/2005 |
| JP | 2008-203813 A | 9/2008 |
| JP | 2008-292809 A | 12/2008 |
| JP | 2009-058776 A | 3/2009 |
| JP | 2009-058776 A | 5/2009 |
| JP | 2011-099986 A | 5/2011 |

* cited by examiner

MICROSCOPE APPARATUS HAVING A MODULATION-REGION ADJUSTING UNIT THAT MOVES A WAVEFRONT MODULATION REGION IN RESPONSE TO PIVOTING OF MIRRORS

BACKGROUND OF THE INVENTION

1. Field of the Invention

The present invention relates to microscope apparatuses.

This application is based on Japanese Patent Application No. 2010-011046, the content of which is incorporated herein by reference.

2. Description of Related Art

Conventionally, a scanning confocal microscope apparatus is known in which a laser beam whose wavefront is deformed by a deformable mirror is made incident on an objective lens via a galvanometer mirror unit (for example, see Japanese Unexamined Patent Application, Publication No. 2005-165212). This apparatus is configured to change the point at which the laser beam is focused in the depth direction by changing a reflective surface of the deformable mirror.

However, in the scanning confocal microscope apparatus disclosed in Patent Citation 1, a modulated wavefront relayed to a pupil surface of an objective lens by a lens and an image-forming lens is shifted on the pupil surface in a direction perpendicular to the optical axis, due to pivoting of the galvanometer mirror. Such a shift leads to increase coma, which is similar to eccentricity. Such a shift is insignificant at the center of an image acquisition region but increases toward the periphery, which significantly deteriorates the optical performance.

BRIEF SUMMARY OF THE INVENTION

The present invention has been made in view of the above-described circumstances, and an object thereof is to provide a microscope apparatus that can two-dimensionally scan illuminating light guided from a light source across a specimen, without changing the ability to focus the illuminating light on the specimen.

To achieve the above-described object, the present invention provides the following solutions.

The present invention provides a microscope apparatus including a spatial light modulator that modulates the wavefront of illuminating light from a light source; a scanner that has two mirrors independently pivoted about two non-parallel axes, and that two-dimensionally scans the illuminating light whose wavefront has been modulated by the spatial light modulator; a relay optical system that guides the illuminating light, whose traveling direction has been changed by the scanner, to an objective optical system; and a modulation-region adjusting unit that moves a wavefront modulation region of the spatial light modulator, in which an image is formed, in response to pivoting of the mirrors. The modulation-region adjusting unit moves the modulation region such that an image at the pupil position of the objective optical system assuming that the mirrors are stationary is moved in the direction opposite to the moving direction of the image relayed to the pupil position of the objective optical system assuming that the mirrors are pivoted while the image on the spatial light modulator is fixed.

DETAILED DESCRIPTION OF THE INVENTION

A microscope apparatus 1 according to an embodiment of the present invention will be described below with reference to the drawings.

Figure 1:
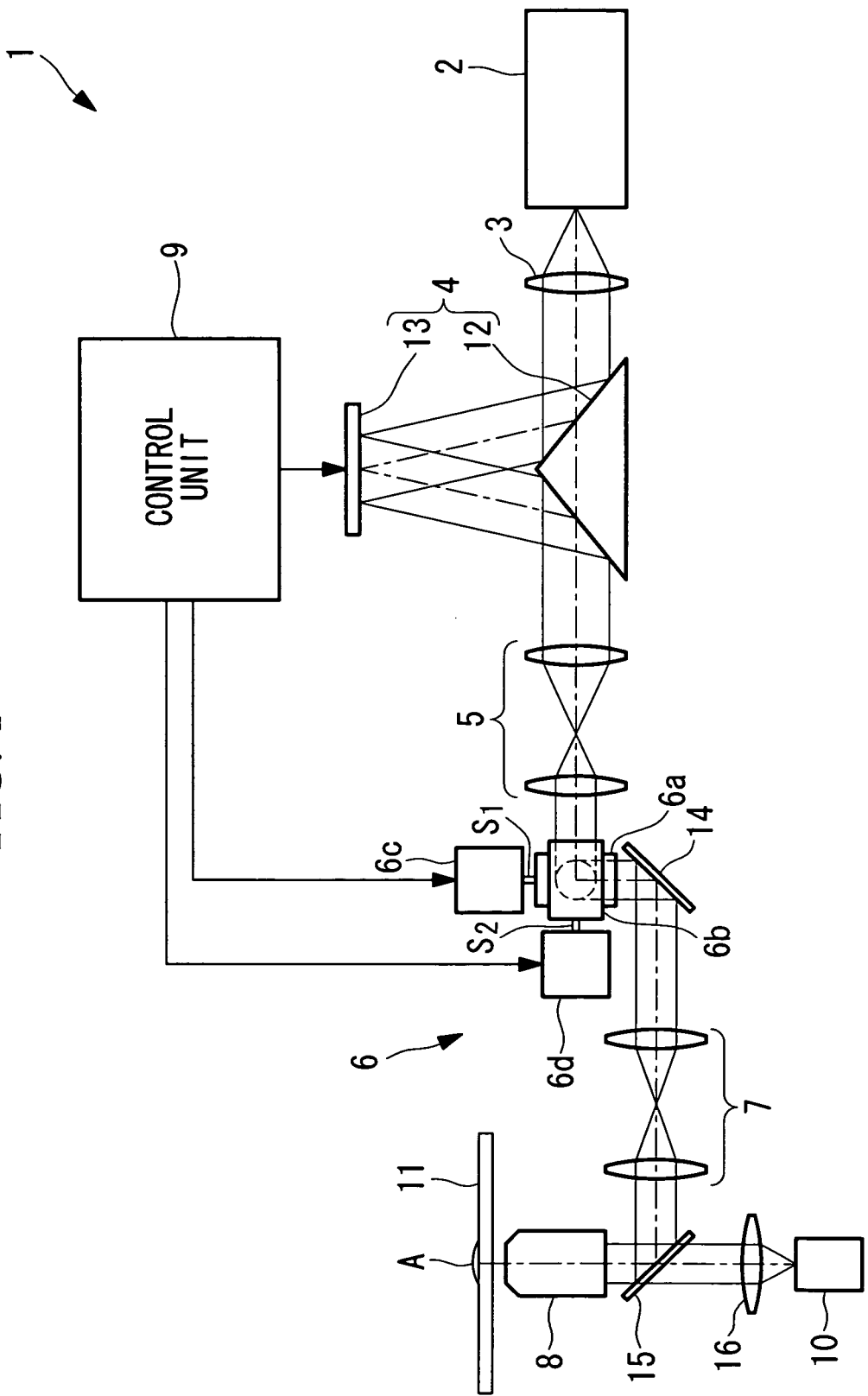
FIG. 1 is a diagram showing the overall configuration of a microscope apparatus according to an embodiment of the present invention.

As shown in FIG. 1, the microscope apparatus 1 according to this embodiment includes a light source 2 that generates a laser beam (illuminating light), a collimator lens 3 that converts the wavefront of the laser beam generated by the light source 2 into a substantially plane wave, a wavefront modulating unit 4 that modulates the wavefront of the laser beam converted into a substantially plane wave, a first relay optical system 5 that relays the laser beam whose wavefront is modulated by the wavefront modulating unit 4, a scanner 6 that two-dimensionally scans the laser beam relayed by the first relay optical system 5, a second relay optical system (relay optical system) 7 that relays the laser beam scanned by the scanner 6, an objective optical system 8 that focuses the laser beam relayed by the second relay optical system 7, a control unit 9 that controls the scanner 6 and the wavefront modulating unit 4, and a photodetector 10 that detects fluorescence from a specimen A collected by the objective optical system 8. In the figure, the reference sign 11 denotes a stage that carries the specimen A placed on a slide glass.

The wavefront modulating unit 4 includes a prism 12 that reflects a laser beam converted into a substantially plane wave by the collimator lens 3, and a reflective spatial light modulator 13 that reflects the laser beam reflected by the prism 12. At this time, the reflective spatial light modulator 13 modulates the wavefront of the laser beam such that it conforms to the surface shape thereof and returns the laser beam to the prism 12.

The optical path of the laser beam reflected by the prism 12 is folded back by the spatial light modulator 13 so as to return to the same prism 12 and is returned by the prism 12 to the optical path coaxial with the laser beam from the light source 2.

The spatial light modulator 13 is composed of segmented MEMS, which can arbitrarily change the surface shape thereof according to a shape instruction signal from the control unit 9. The spatial light modulator 13 and the entrance pupil position of the objective optical system 8 are located to have an optically conjugate positional relationship.

Figure 3:
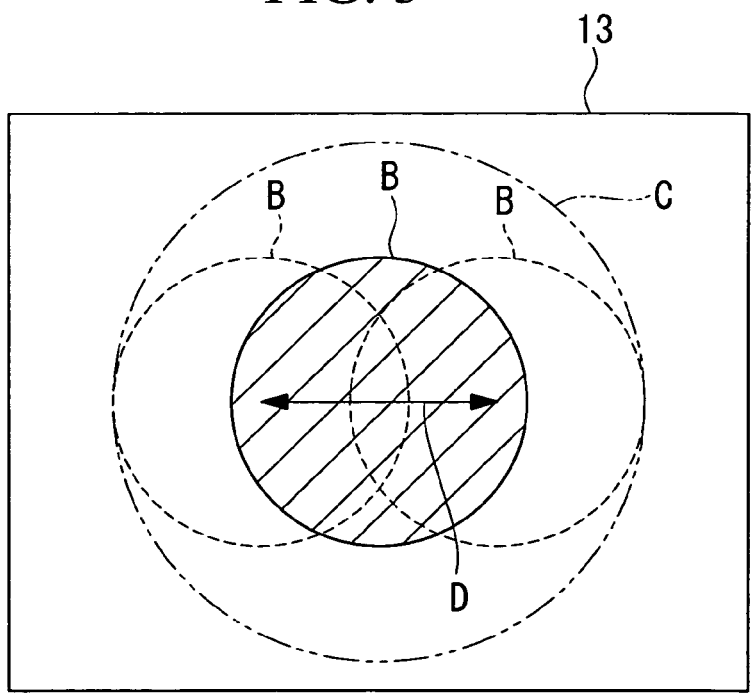
FIG. 3 is a diagram for describing the movement of a modulation region of a spatial light modulator of the microscope apparatus in FIG. 1, in the case of FIG. 2.

As shown by a chain line in FIG. 3, the laser beam made incident on the spatial light modulator 13 by the collimator lens 3 illuminates a region C (hereinafter referred to as an "illuminated region") that includes and is larger than a region B in which the wavefront is actually modulated (hereinafter referred to as a "modulation region").

Figure 2:
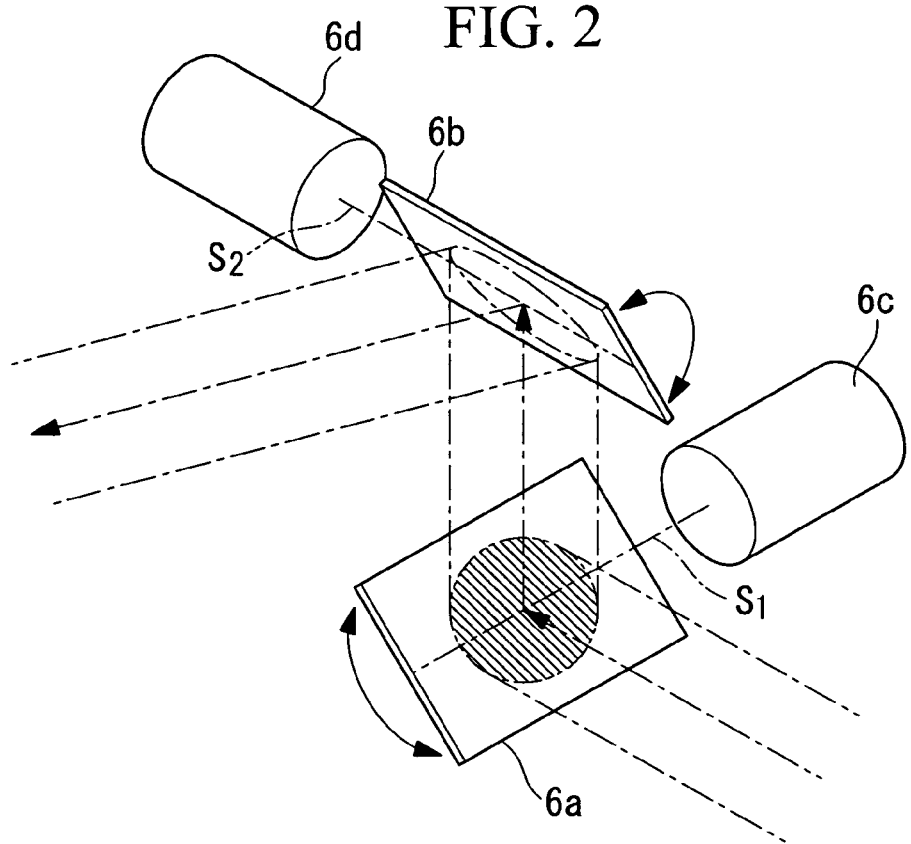
FIG. 2 shows a scanner of the microscope apparatus in FIG. 1 and is a perspective view showing an example in which a position optically conjugate with a pupil position of an objective optical system is disposed at a higher-speed mirror.

As shown in FIG. 2, the scanner 6 includes two mirrors 6a and 6b that can pivot about two pivot axes $S_1$ and $S_2$ disposed in a skewed manner, respectively. One pivot axis $S_1$ is disposed in a plane perpendicular to the other pivot axis $S_2$. With this configuration, as viewed from one direction along the above-mentioned plane, the two pivot axes $S_1$ and $S_2$ are disposed perpendicular to each other, as shown in FIG. 1.

One mirror 6a is designed to pivot at a sufficiently higher pivot speed than the other mirror 6b. The high-speed-side mirror 6a is used to scan the laser beam across the specimen A, and the low-speed-side mirror 6b is used to advance the scanning position of the laser beam on the specimen A. In the figure, the reference signs 6c and 6d denote motors for pivoting the mirrors 6a and 6b, and the reference sign 14 denotes a mirror.

As shown in FIG. 2, the high-speed-side mirror 6a is disposed at a position optically conjugate with an entrance pupil position of the objective optical system 8. The hatching in FIG. 2 shows that the higher-speed mirror 6a is disposed at a position optically conjugate with the entrance pupil position of the objective optical system 8.

The first relay optical system 5 and the second relay optical system 7 are each composed of a plurality of lenses. The first relay optical system 5 is configured to relay an image formed on the surface of the spatial light modulator 13 to the surface of the higher-speed mirror 6a. The second relay optical system 7 is configured to relay the image formed on the surface of the high-speed-side mirror 6a to the entrance pupil position of the objective optical system 8.

In FIG. 1, the reference sign 15 denotes a dichroic mirror that reflects the laser beam while allowing the fluorescence to pass therethrough, and the reference sign 16 denotes a condenser lens. The fluorescence having passed through the dichroic mirror 15 is focused by the condenser lens 16 and is detected by the photodetector 10. By storing the intensity of the fluorescence detected by the photodetector 10 in association with the information about the position of the scanner 6 scanning the laser beam during detection, a two-dimensional fluorescence image can be obtained.

The control unit 9 outputs a shape instruction signal to the spatial light modulator 13 so that the surface of the modulation region B of the spatial light modulator 13 forms a preset shape. The surface shape of the modulation region B of the spatial light modulator 13 is such that it can modulate the wavefront of the plane wave incident on the modulation region B and can focus it on one point at a focal position of the objective optical system 8. This surface shape can be calculated or measured in advance, taking into consideration various aberrations of the optical systems, the refractive index distribution of the specimen A, and the like.

Furthermore, the control unit 9 outputs angle instruction signals for instructing the pivot angles to the motors 6c and 6d that pivot the mirrors 6a and 6b of the scanner 6. In synchronization with this angle instruction signal, the control unit 9 outputs a movement instruction signal for moving the modulation region B, in which the above-described surface shape is formed, within the illuminated region C, which is a region of the spatial light modulator 13 over which the laser beam is illuminated, as shown by an arrow D in FIG. 3.

More specifically, the wavefront modulation region B of the spatial light modulator 13 is moved in response to pivoting of the mirror 6b in such a manner that the image of the laser beam is moved, assuming that the lower-speed mirror 6b is fixed, in the direction opposite to the moving direction of the image of the laser beam at the entrance pupil position of the objective optical system 8 assuming that the low-speed-side mirror 6b is pivoted while the modulation region B of the spatial light modulator 13 is fixed.

The operation of the thus-configured microscope apparatus 1 according to this embodiment will be described below.

In order to observe the fluorescence from the specimen A using the microscope apparatus 1 according to this embodiment, in a state in which the control unit 9 outputs a shape instruction signal for instructing the surface shape in the modulation region B to the spatial light modulator 13, a laser beam generated by the light source 2 is converted into a substantially plane wave by the collimator lens 3 and is made incident on the wavefront modulating unit 4.

The laser beam incident on the wavefront modulating unit 4 is reflected by the prism 12 and is incident on the spatial light modulator 13. In the spatial light modulator 13, the laser beam illuminates the illuminated region C that includes and is larger than the modulation region B, and only the wavefront of a portion of the laser beam incident on the modulation region B is modulated and reflected, is then reflected by the prism 12, and is incident on the first relay optical system 5.

The first relay optical system 5 relays an image in the modulation region B of the spatial light modulator 13 to the surface of the high-speed-side mirror 6a of the scanner 6 disposed at a position optically conjugate therewith. In the scanner 6, the reflected laser beam is pivoted in the scanning direction by pivoting the higher-speed mirror 6a, and the reflected laser beam is pivoted in the advancing direction by pivoting the lower-speed mirror 6b. Thus, the laser beam is two-dimensionally scanned.

The laser beam scanned by the scanner 6 is incident on the second relay optical system 7.

The second relay optical system 7 relays an image of the laser beam formed on the surface of the higher-speed mirror 6a to the entrance pupil position of the objective optical system 8 disposed at a position optically conjugate therewith.

In this manner, the image in the modulation region B of the spatial light modulator 13 is relayed to the entrance pupil position of the objective optical system 8.

In this case, if the scanner 6 is activated while the modulation region B of the spatial light modulator 13 is fixed, pivoting of the lower-speed mirror 6b causes the image of the laser beam relayed to the entrance pupil position of the objective optical system 8 to move linearly in the direction intersecting the optical axis. This direction of movement is assumed to be direction P, and the amount of movement is assumed to be $\Delta P$. If, conversely, the modulation region B of the spatial light modulator 13 is moved as shown by the arrow D within the illuminated region C while the lower-speed mirror 6b of the scanner 6 is stopped, the image of the laser beam relayed to the entrance pupil position of the objective optical system 8 moves linearly in the direction intersecting the optical axis. This direction of movement is assumed to be direction Q, and the amount of movement is assumed to be $\Delta Q$.

In this embodiment, because the control unit 9 moves the modulation region B of the spatial light modulator 13 such that the direction P and the direction Q are opposite to each other and such that $\Delta P = \Delta Q$, the image of the laser beam relayed to the entrance pupil position of the objective optical system 8 can be maintained stationary, regardless of pivoting of the lower-speed mirror 6b. Furthermore, in this case, because the modulation region B of the spatial light modulator 13 is moved in the direction intersecting the optical axis of the laser beam so that the image at the entrance pupil position of the objective optical system 8 is not moved by pivoting the mirrors 6a and 6b of the scanner 6, the wavefront modulated by the spatial light modulator 13 can be accurately relayed to the entrance pupil position of the objective optical system 8, thereby preventing degradation in the light focusing ability.

This configuration provides an advantage in that, because aberrations of various optical systems and aberrations generated by the refractive index distribution etc., in the specimen A are compensated for, the laser beam can be precisely focused on one desired point in the specimen A by the objective optical system 8. If the laser beam generated by the light source 2 is an extremely short pulse laser beam, fluorescence can be generated by a multiphoton excitation effect only at the focal position of the objective optical system 8. Thus, a sharp fluorescence image can be obtained.

Furthermore, in this embodiment, because the pivot axis of the higher-speed mirror 6a constituting the scanner 6 is disposed at a position optically conjugate with the surface of the spatial light modulator 13 and the entrance pupil position of the objective optical system 8, moving the modulation region B in response to pivoting of the high-speed-side mirror 6a is unnecessary. Accordingly, it is sufficient to move the modulation region B of the spatial light modulator 13 in response to pivoting of the lower-speed mirror 6b, whose speed is much lower than the higher-speed mirror 6a, and the responsiveness of which may be low. Therefore, displacement of the image of the laser beam incident on the entrance pupil position of the objective optical system 8, due to pivoting of the mirrors 6a and 6b, can be more reliably prevented.

Furthermore, because not the spatial light modulator 13, but the modulation region on the spatial light modulator 13 is moved, it can be moved at high speed without causing vibration.

Figure 4:
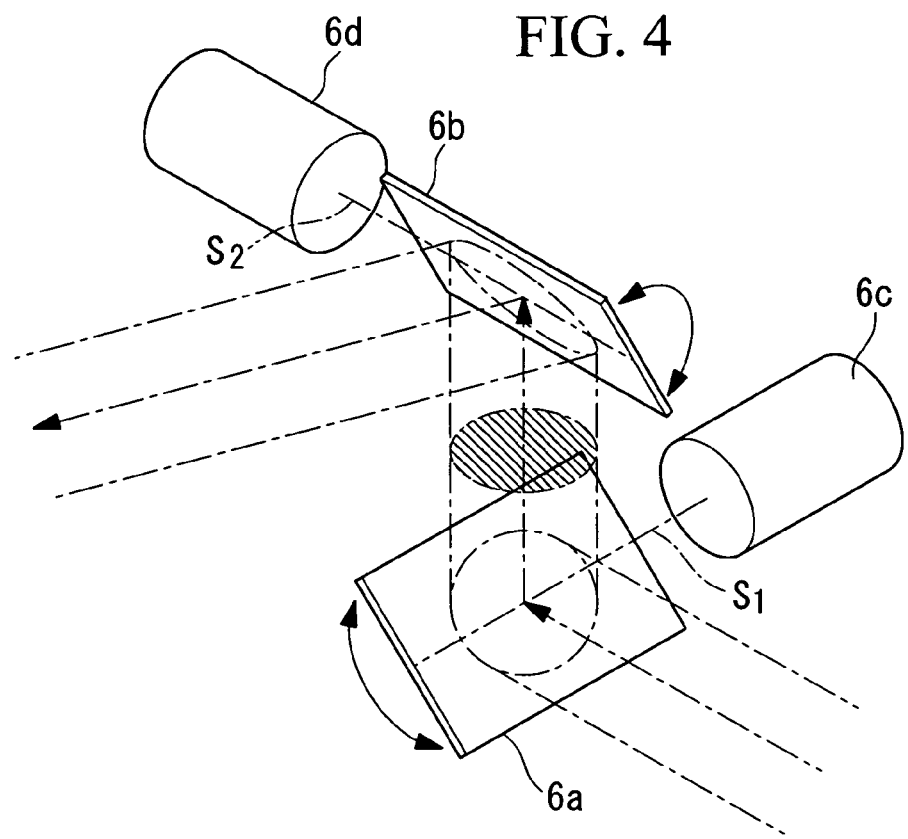
FIG. 4 is a modification of FIG. 2, showing the scanner of the microscope apparatus in FIG. 1, and is a perspective view showing an example in which a position optically conjugate with a pupil position of an objective optical system is located between the higher-speed mirror and a lower-speed mirror.

Note that, although a position optically conjugate with the entrance pupil position of the objective optical system 8 is disposed on the pivot axis $S_1$ of the higher-speed mirror 6a of the scanner 6 in this embodiment, the configuration is not limited thereto. For example, as shown in FIG. 4, the position optically conjugate with the entrance pupil position of the objective optical system 8 may be disposed between the two mirrors 6a and 6b. In the figure, the hatching shows the conjugate position.

Figure 5:
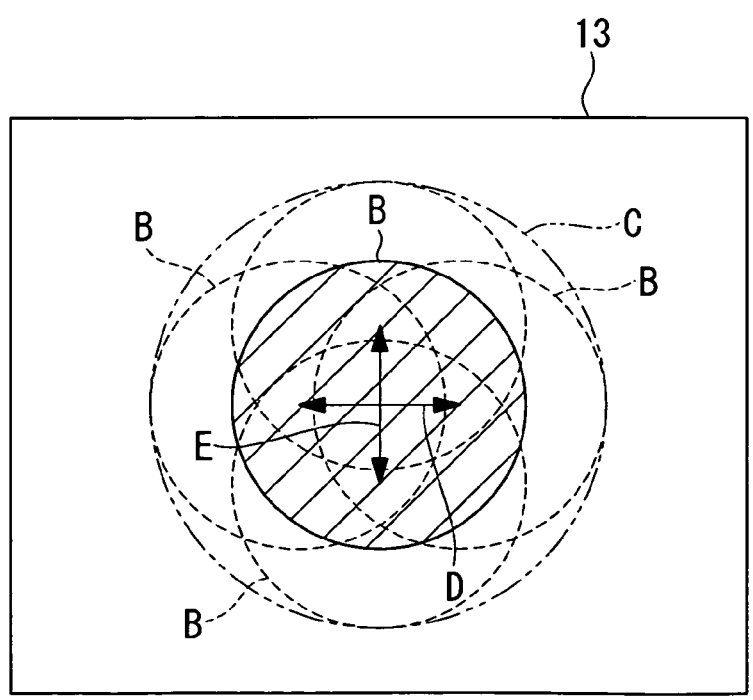
FIG. 5 is a diagram for describing the movement of the modulation region of the spatial light modulator of the microscope apparatus in FIG. 1, in the case of FIG. 4.

By doing so, pivoting of either of the two mirrors 6a and 6b affects the image of the laser beam relayed to the entrance pupil position of the objective optical system 8. In order to keep it stationary, as shown in FIG. 5, the modulation region B has to be moved not only in the arrow D direction, but also in the arrow E direction perpendicular thereto.

Meanwhile, by locating the position optically conjugate with the entrance pupil position of the objective optical system 8 between the two mirrors 6a and 6b, the amount of movement of the image relayed to the entrance pupil position of the objective optical system 8 in one direction due to pivoting of the mirrors 6a and 6b is reduced. Accordingly, compared with the above-described embodiment, there are advantages in that the area of the illuminated region C can be set small, thereby increasing the light intensity density at respective parts in the spatial light modulator 13 and improving the illumination efficiency. For example, when the position optically conjugate with the entrance pupil position of the objective optical system 8 is located precisely in the middle between the two mirrors 6a and 6b, the amount of movement of the image relayed to the entrance pupil position of the objective optical system 8 in one direction is halved, compared with the case where it is located at one of the two mirrors 6a and 6b.

Figure 6:
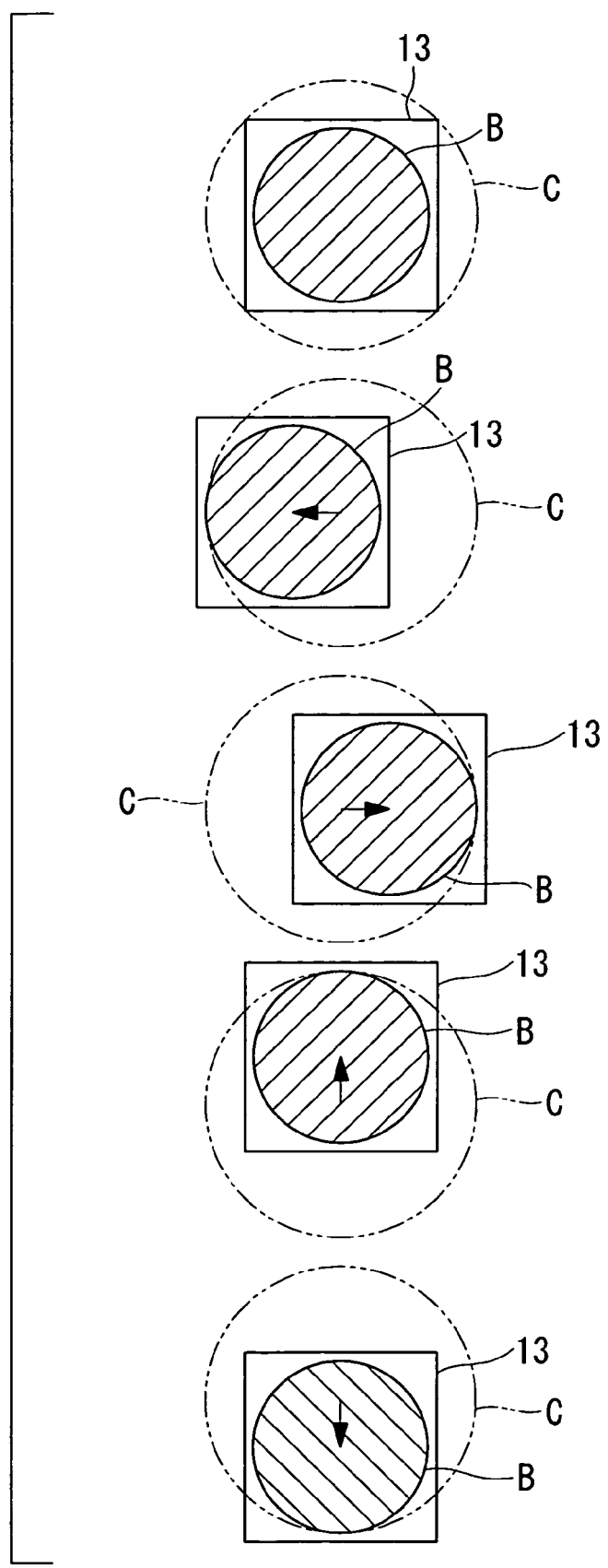
FIG. 6 is a modification of FIG. 5 and is a diagram for describing the movement of the modulation region in the case where the spatial light modulator itself is moved.

Furthermore, although the modulation region B is moved in the spatial light modulator 13 in this embodiment, the spatial light modulator 13 itself may be moved in the direction intersecting the optical axis relative to the illumination region C instead, as shown in FIG. 6. This enables the modulation region B to be provided over substantially the entire spatial light modulator 13, and it is possible to perform more detailed wavefront modulation utilizing the full spatial resolution of the spatial light modulator 13.

Furthermore, although an example of the spatial light modulator 13 according to this embodiment was a segmented MEMS mirror that changes the surface shape thereof, any another spatial light modulator 13, for example, a liquid crystal device or a deformable mirror, may be used instead.

What is claimed is:

1. A microscope apparatus comprising:
   a spatial light modulator that modulates the wavefront of illuminating light from a light source;
   a scanner that has two mirrors independently pivoted about two non-parallel axes, and that two-dimensionally scans the illuminating light whose wavefront has been modulated by the spatial light modulator;
   a relay optical system that guides the illuminating light, whose traveling direction has been changed by the scanner, to an objective optical system; and
   a modulation-region adjusting unit that moves a wavefront modulation region of the spatial light modulator, in which an image is formed, in response to pivoting of the mirrors,
   wherein:
      a first direction is a direction in which the image of the modulation region relayed to a pupil position of the objective optical system would move when the mirrors are pivoted while the modulation region is fixed,
      a second direction is a direction in which the image of the modulation region relayed to the pupil position of the objective optical system would move when the mirrors are stationary while the modulation region is moved, and
      the modulation-region adjusting unit moves the modulation region when the mirrors are pivoted so that the second direction is opposite to the first direction, thereby keeping a position of the image of the modulation region relayed to the pupil position of the objective optical system stationary.

2. The microscope apparatus according to claim 1, wherein the modulation-region adjusting unit moves the modulation region in the spatial light modulator.

3. The microscope apparatus according to claim 1, wherein the modulation-region adjusting unit moves the spatial light modulator.

4. The microscope apparatus according to claim 1, wherein the pivot axis of one mirror is disposed in a plane perpendicular to the pivot axis of the other mirror of the scanner, and the pupil position of the objective optical system and the position of one of the mirrors on the pivot axis have an optically conjugate relationship.

5. The microscope apparatus according to claim 4, wherein the pupil position of the objective optical system and the position, on the pivot axis, of the mirror that is pivoted at a higher speed in the two mirrors have an optically conjugate relationship.

6. The microscope apparatus according to claim 1, wherein the pupil position of the objective optical system and a position between the two mirrors have an optically conjugate relationship.

7. The microscope apparatus according to claim 1, wherein the relay optical system is a second relay optical system, and the microscope apparatus includes a first relay optical system that relays an image on the spatial light modulator to a position having an optically conjugate relationship with the pupil position of the objective optical system of the second relay optical system.

8. The microscope apparatus according to claim 1, wherein the modulation-region adjusting unit is a control unit that pivots the mirror.

9. The microscope apparatus according to claim 8, wherein the control unit outputs angle instruction signals instructing pivot angles to motors that pivot the mirrors of the scanner.

* * * * *